Nov. 1, 1966    J. C. CLEARY, JR., ETAL    3,282,155
SLIDE PROJECTION CONTROL SYSTEM
Filed Sept. 25, 1964

James C. Cleary, Jr.
Walter O. LeCroy, Jr.
John E. Porter
INVENTORS

BY *Clarence A. O'Brien*
*and Harvey B. Jackson*
Attorneys

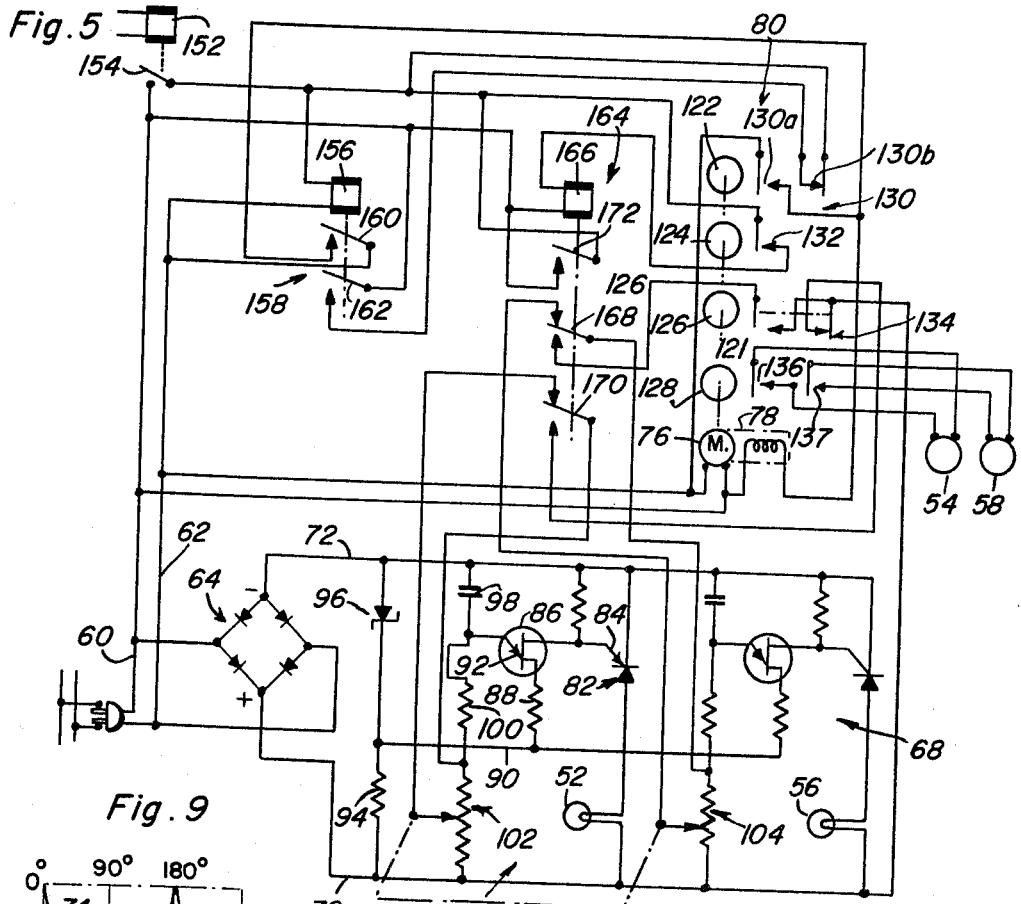

James C. Cleary, Jr.
Walter O. LeCroy, Jr.
John E. Porter
INVENTORS

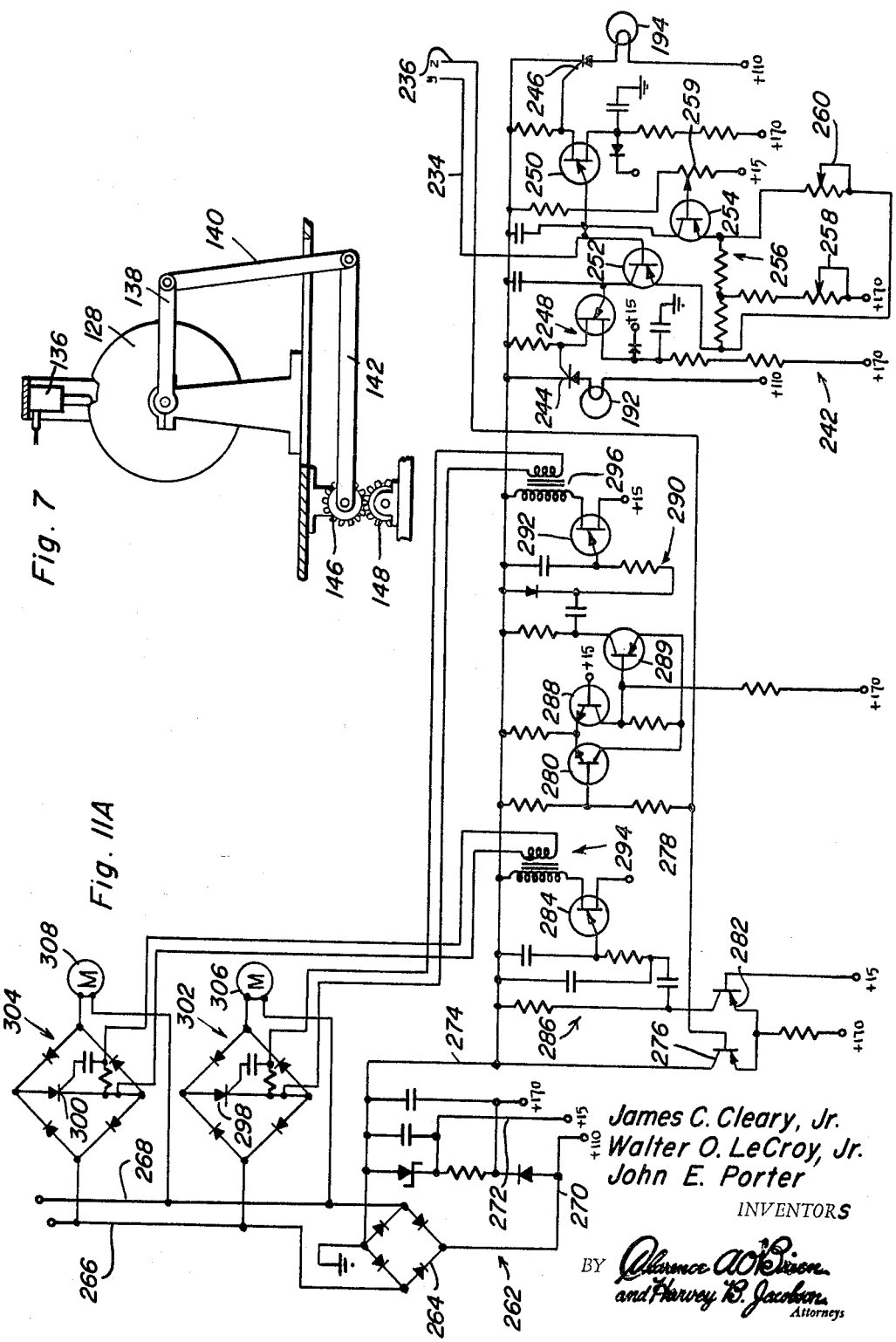

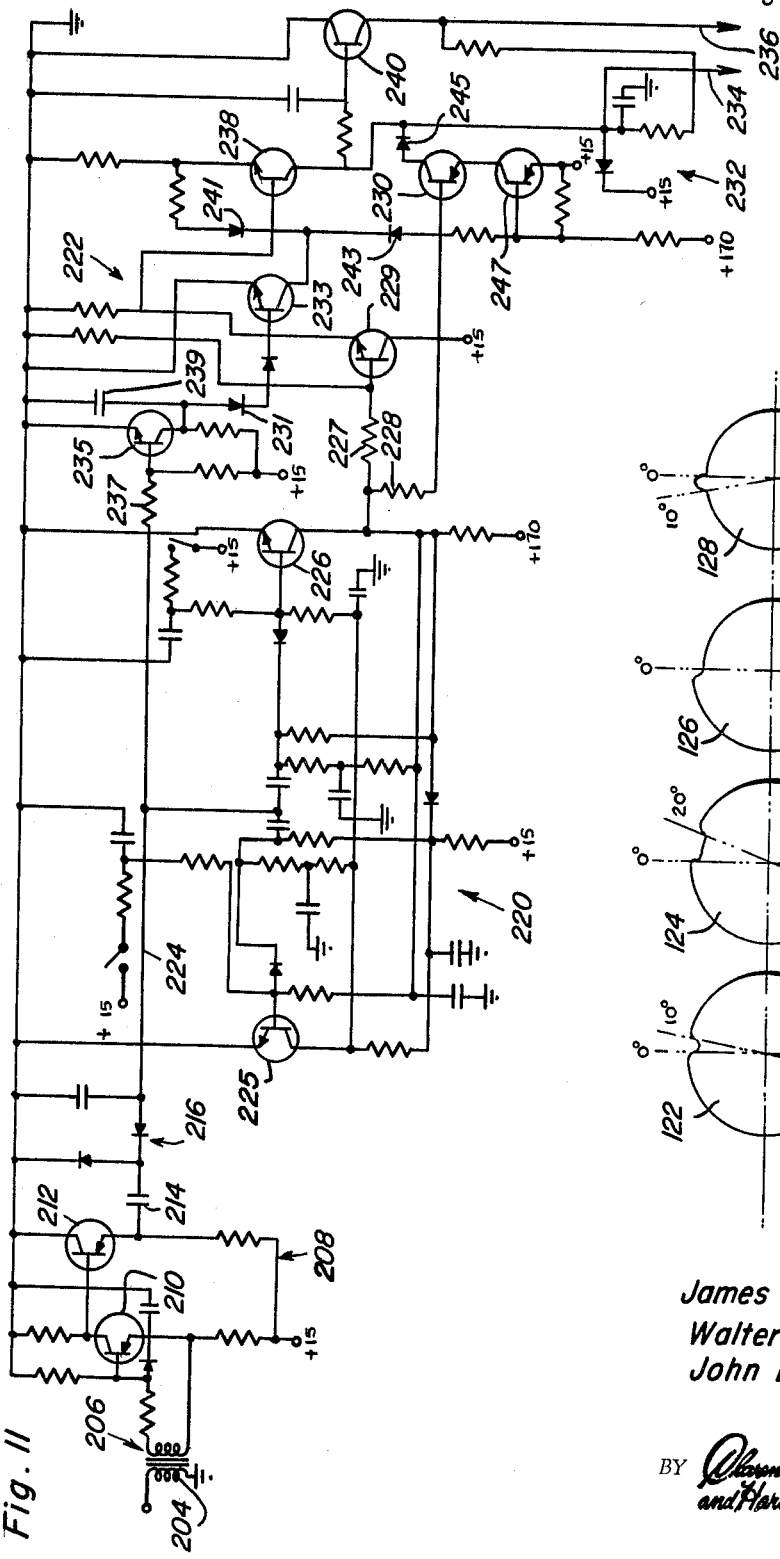
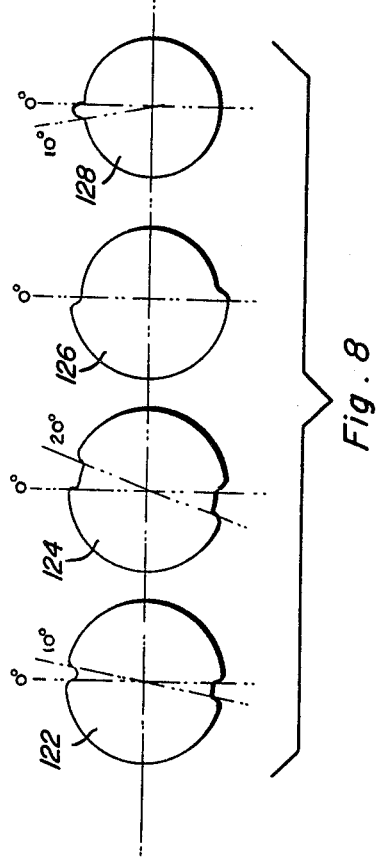
Fig. 11
Fig. 8
James C. Cleary, Jr.
Walter O. LeCroy, Jr.
John E. Porter
INVENTORS

United States Patent Office 3,282,155
Patented Nov. 1, 1966

3,282,155
SLIDE PROJECTION CONTROL SYSTEM
James C. Cleary, Jr., 28 Pengilly Drive, New Rochelle, N.Y.; Walter O. Le Croy, Jr., 116 S. Buckhout St., Irvington, N.Y.; and John E. Porter, North White Plains, N.Y. (155 W. 68th St., New York, N.Y.)
Filed Sept. 25, 1964, Ser. No. 399,151
7 Claims. (Cl. 88—28)

This invention relates to the changeover between projectors and more particularly to a control system automatically operative to control and regulate the slide advancing mechanism and projection lamps of a pair of slide projectors alternatively operative to project images on a common screen area.

The system of the present invention is associated with a pair of automatic slide-type of projectors whereby changeover or crossover between the projectors is effected at programmed intervals synchronized with the playback of prerecorded program material such as voice, music and sound effects associated with the images being projected. The control system of the present invention is therefore operatively connected to the slide changing mechanisms of the projectors, and the projector lamp circuits so as to effect the changeover between the projectors and during the transition interval, regulate the dimming of one of the projector lamps simultaneously with the energization of the other projector lamp toward maximum or full brilliance. The signal for initiating the changeover is received by the control system from a cue signal track of a dual channel magnetic tape driven by a transport mechanism associated with a recording and playback device to which the control system is connected for such purpose. The recording and playback device may therefore be utilized to record the program material and the cue signals on the two tracks of the magnetic tape associated therewith so that during playback, changeover operation may be effected in synchronization with the program material.

It is therefore a primary object of the present invention to provide a control system through which the image replacement effected during changeover between the slide projectors may be selectively controlled in synchronization with the operation of the slide advance mechanisms so as to produce either slow or rapid cross fade or dissolve image transition.

An additional object of the present invention is to provide a control system through which cross fading between the images projected by the slide projectors as aforementioned, may be regulated in such a fashion as to virtually eliminate image reddening which heretofore characterized the projection images during the transition period.

An additional object of the present invention is to provide a control system through which two projection lamps are alternatively dimmed without any significant heat or power dissipation.

A still further object of the present invention is to provide a control system for regulating the dimming of projection lamps during the changeover interval while maintaining a minimum voltage on both lamps at all times during the changeover interval so as to eliminate thermal shock and significantly extend the life of the projection lamps.

Yet another object of the present invention is to provide a control system through which the speed with which crossover of the projection lamps effected, may be selectively controlled in accordance with the duration of the cue signal, a cue signal of long duration producing a rapid dissolve action while a cue signal of a shorter duration producing a relatively slow dissolve action during a fixed changeover cycle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is an electrical circuit diagram corresponding to the system diagrammatically illustrated in FIGURE 4.

FIGURE 7 is an end view taken substantially through a plane indicated by section line 7—7 in FIGURE 6.

FIGURE 8 is a cam layout diagram associated with the switching mechanism illustrated in FIGURES 6 and 7.

FIGURE 9 is a graphical illustration corresponding to the voltage variations produced in the electrical control circuit of FIGURE 5.

FIGURES 11 and 11a illustrate an exemplary electrical circuit diagram corresponding to the system diagrammatically illustrated in FIGURE 10.

Figure 1:
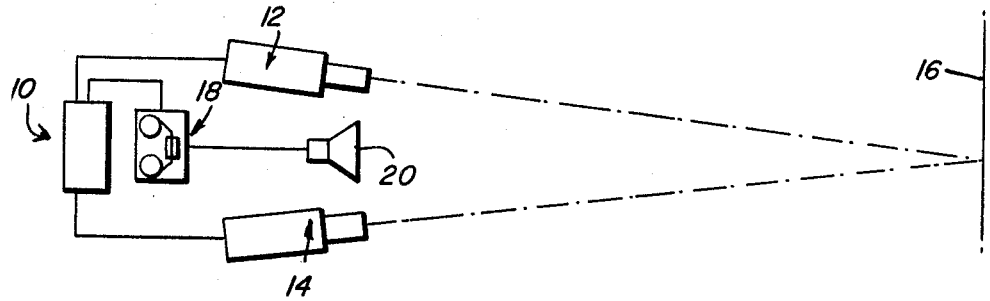
FIGURE 1 is a simplified diagrammatic view of the installation associated with the system of the present invention.
Figure 3:
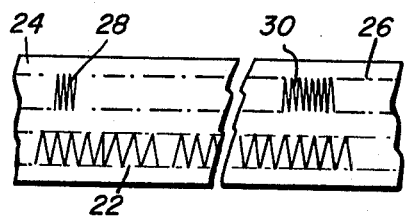
FIGURE 3 is an illustration of the dual track recording tape utilized in connection with the system of the present invention.

Referring now to the drawings in detail, and initially to FIGURE 1, it will be observed that the system of the prsent invention involves a control system generally referred to by reference numeral 10 associated with a pair of slide projectors 12 and 14. The slide projectors are arranged relative to each other so as to project images on a common screen area 16, the projection of the images being alternatively effected by the projectors 12 and 14. For use in connection with the images projected on the screen area 16, a tape recorder 18 is utilized so that during projection, playback operation of the tape recorder will produce an audio-output from the speaker 20 in the form of program material such as voice, music and sound effects. The program material may therefore be carried on a program track 22 of a dual track type of magnetic recording tape 24 as illustrated in FIGURE 3. A cue signal track 26 will therefore also be provided on the recording tape on which cue signals may be recorded in synchronization with the program material carried by the program track 22. It will therefore be apparent, that at the proper intervals the cue signals will be operative through the control system 10 to initiate changeover between the projectors by simultaneous operation of the slide changing mechanisms associated with the projectors. Crossover between the images will be effected during the changeover cycle either rapidly or slowly dependent upon the duration of the cue signal. Accordingly, as illustrated in FIGURE 3, the cue track 26 may be provided with a fast dissolve cue signal 30 of relatively long duration and a slow dissolve cue signal 28 of relatively shorter duration.

Figure 2:
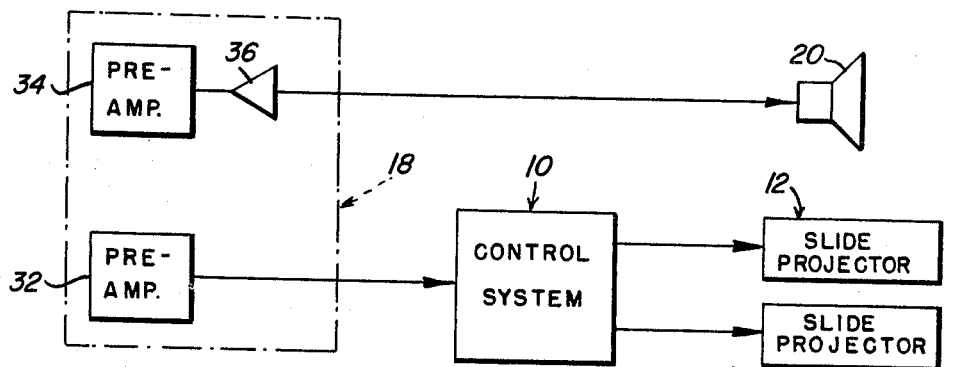
FIGURE 2 is a block diagram generally showing the system of the present invention.
Figure 4:
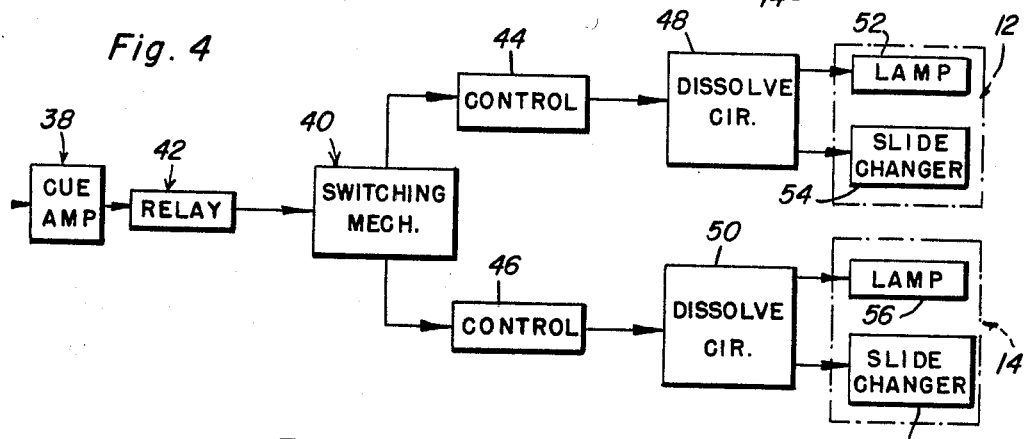
FIGURE 4 is a block diagram showing one particular form of the system of the present invention.

As more readily seen in FIGURE 2, the control system 10 is connected to the slide projectors 12 and 14 for effecting the changeover operation upon receipt of a cue signal from the preamplifier component 32 of the tape recorder, said cue signal being derived from the cue track 26 as aforementioned. The cue signal will be synchronized with program material supplied through the preamplifier 34 and power output amplifier 36 to the speaker 20. The control system as illustrated in FIGURE 4, may be provided with a cue signal amplifier 38 through which the cue signal is amplified producing an operating pulse operative on a switching mechanism 40 through relay component 42. The switching mechanism is then operative through control circuits 44 and 46 to regulate operation of dissolve circuits 48 and 50. The dissolve circuit 48 is then operative to either dim or energize toward full brilliance the projection lamp 52 associated with the projector 12 during the changeover cycle terminated by operation of the slide changer 54 also associated with the projector 12. The foregoing action occurs simultaneously with the control exercised by the dissolve circuit 50 on the projector lamp 56 associated with the slide projector 14 and the slide changer 58. It will of course be appreciated, that while the lamp 52 is being dimmed, the voltage across lamp 56 will be raised toward full brilliance and vice versa. The reversal occurs of course successively each changeover cycle.

The system depicted in FIGURE 4 may be achieved by the electrical control circuit illustrated in FIGURE 5. Power for the control circuit from a standard A.C. source is supplied by the powerlines 60 and 62. Connected across the powerlines is a full wave rectifier 64 by means of which a D.C. voltage pulsating at the same frequency as the A.C. voltage across lines 60 and 62, is applied to the dimmer circuits 66 and 68 by means of the rectified voltage lines 70 and 72. Accordingly, a negative D.C. voltage of 170 volts will be applied to line 72 as depicted by the curve 74 in FIGURE 9 during each changeover cycle of 180° duration. This cycle corresponds to 180° of motor rotation associated with the motor 76. The entire cycle is about three seconds for a motor speed of 10 r.p.m. The motor is therefore rendered operative through an electromagnetically controlled clutch 78 to effect rotation of a cam operated switch assembly generally referred to by reference numeral 80 through which the lamp dimming interval is controlled and through which operation of the slide changer mechanisms 54 and 58 are effected.

Each of the dimmer circuits includes in series with the lamp filament, a silicon controlled rectifier 82 having a control electrode 84 by means of which the rectifier is switched on. Each lamp filament and current controlling rectifier 82 is therefore connected across the rectified voltage lines 70 and 72 with the control electrode 84 connected to the output element of a unijunction type of transistor 86. The transistor is therefore provided with a bias electrode connected through a bias resistor 88 to a bias voltage line 90. The line 90 is connected between the voltage dropping resistor 94 connected to the line 70 and the Zener diode 96 connected to the line 72 in order to establish the bias voltage on the transistors 86. The emitters 92 of the transistors are connected between the storage capacitors 98 and resistors 100. The resistors 100 are respectively connected to the voltage line 70 through potentiometers 102 and 104. The capacitors 98 will therefore be charged by a voltage in line 72 which follows the D.C. voltage across the lines 70 and 72, the Zener diode 96 being operative to hold 18 volts on the capacitor 98 as depicted by curve 106 in FIGURE 9. The rate at which the capacitors 98 are charged will therefore depend upon the resistance value of the resistors 100 and the settings of the potentiometers 102 and 104. When the potentiometers are at their maximum resistance value, the capacitors 98 will be charged at a relatively slow rate to produce a trigger potential on the emitter 92 of the transistors just before completion of the operational cycle as depicted by the curve 108 in FIGURE 9. When the trigger voltage 110 is attained, the transistor 86 will be rendered conductive so as to produce an output trigger voltage on the control electrode 84 of the silicon controlled rectifier 82 as depicted by curve 112 in FIGURE 9. The rectifier 82 is therefore rendered conductive for a short interval in order to produce a voltage pulse across the lamp filament as depicted by the curve 114 in FIGURE 9. This voltage is however insufficient to produce incandescence of the filament yet is sufficient to maintain the filament heated in order to prevent thermal shock. Upon removal of the output pulse in the control electrode 84, the voltage across the lamp filament reverses to positive for an instant as indicated by the curve 114 in view of the connection of the lamp and rectifier across the output terminals of the full wave rectifier 64. This is operative to ensure that the rectifier 82 is shut off.

When the potentiometer settings are at their minimum resistance value, it will be appreciated that the capacitors 98 will charge at a more rapid rate. Accordingly, a trigger potential will be established on the emitter 92 of the transistor 86 at the beginning of the operation cycle. Therefore, the transistor 86 will be rendered conductive at a predetermined frequency during the operational cycle as depicted by the curve 116 in FIGURE 9. Corresponding output pulses are therefore produced at the control electrode 84 as depicted by the curve 118 in order to successively render the rectifier conductive. The foregoing action results in the development of a voltage in the lamp filament which varies at a non-linear rate as depicted by curve 120. It will therefore be observed, that the voltage in the lamp filament increases to a value sufficient to produce full brilliance. It will however be apparent from the foregoing, that by varying the setting of the potentiometers 102 and 104, the brilliance of the lamps may be varied between extinction and full brilliance as respectively depicted by the curves 114 and 120 in FIGURE 9. Thus, movement of the potentiometers 102 and 104 in opposite directions will simultaneously dim one lamp and raise the voltage of the other lamp toward full brilliance at non-linear rates designed to eliminate reddening of the image projected. The potentiometers 102 and 104 are of the logarithmic taper type and are adapted to be driven in opposite directions at the same time that the cam operated switching assembly 80 is driven by the motor 76.

Figure 6:
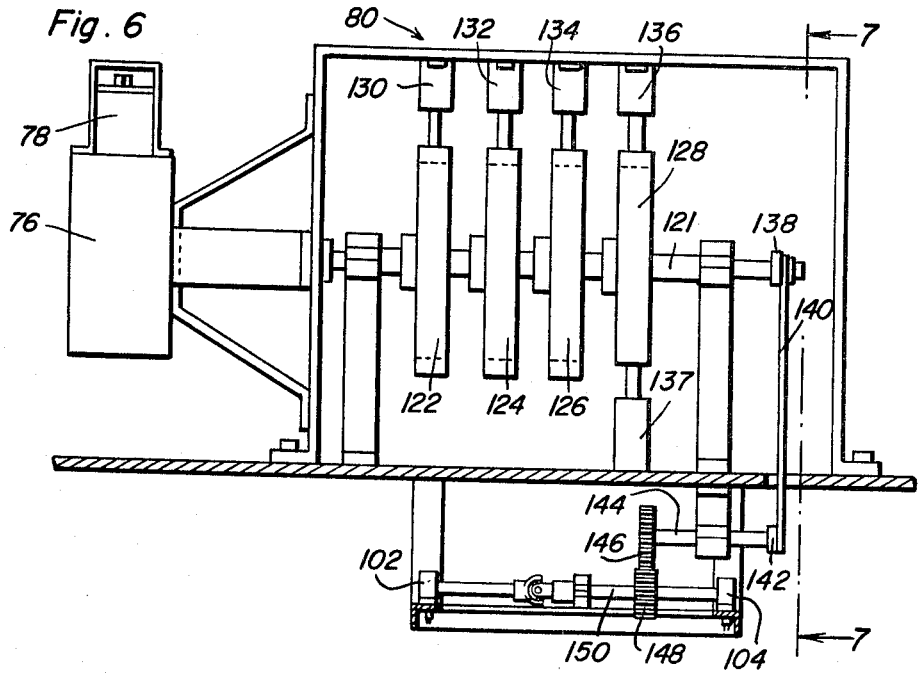
FIGURE 6 is a side elevational view of the motor operated, cam switching mechanism associated with the system illustrated in FIGURES 4 and 5.

Referring now to FIGURES 6, 7 and 8 in particular, it will be observed that the cam operated switch assembly includes a camshaft 121 adapted to be connected to the output shaft of the motor 76 upon energization of the electromagnetic clutch device 78. Secured to the camshaft 121 in axially spaced relation to each other are cam elements 122, 124, 126 and 128, having cam surfaces which respectively engage the switch devices 130, 132, 134, 136 and 137. Connected to one end of the camshaft 121, is a lever element 138 connected by the connecting link 140 to a driven lever element 142. The lever element 142 is connected to one end of a driven shaft 144 to which the gear element 146 is connected. The gear element 146 meshes with a gear member 148 secured to the shaft 150 from which the potentiometer devices 102 and 104 are varied in opposite directions. The driven shaft 150 therefore undergoes 180° rotation for each 180° rotation of the camshaft 121 to produce a complete changeover cycle. Rotation of the camshaft 121 for such purpose of course occurs when the electromagnetic clutch 78 is energized so as to connect the output of the motor 76 to the cam shaft.

With continued reference to FIGURE 8 and to FIGURE 5, it will be observed that the normally open clutch holding switch 130a and the normally closed relay disabling switch 130b are actuated after the cam 122 undergoes 10° rotation from its zero starting position. After the cams undergo 20° rotation, the cam element 124 actuates the potentiometer control switch 132 from its normally open position to a closed position. The cam 126 is operative on the switch 134 to maintain one of the switch sections thereof open and the other closed reversing each during successive 180° cycles. Finally, the cam element 128 is operative to operate one of the slide changing mechanisms 54 or 58 after undergoing 170° rotation by closing one of the normally open slide changer switches 136 or 137.

The amplified cue signal is supplied to the control system by energization of the cue signal relay coil 152 operative to thereby close the normally open cue signal relay switch 154. An energizing circuit is thereby completed through the relay coil 156 of the starting relay 158 having a normally open clutch relay switch 160 and a normally open relay holding switch 162. Energization of the relay coil 156 is therefore operative to close the relay switch 160 in order to complete an energizing circuit across the powerlines for the electromagnetic clutch 78. Closing of the relay holding switch 162 on the other hand establishes a parallel energizing circuit for the relay coil 160 so as to maintain the relay energized after the cue signal relay switch 154 is opened upon cessation of the cue signal in the relay coil 152. It will therefore be apparent, that upon energization of the starting relay 158, operation of the control system is initiated by rendering the cam operated switching assembly 80 operative.

If the cue signal is of a relatively short duration, so that it ceases before the cam elements undergo 20° rotation, the potentiometer control relay 164 is never energized inasmuch as the cue signal relay switch 154 is in series with the normally open potentiometer control switch 132, closed by the cam element 124 after it undergoes 20° rotation. Energization of the relay coil 166 therefore requires the closing of the cue signal switch 154 and the normally open potentiometer control switch 132 at the same time. With the relay coil 166 de-energized, the potentiometer shunting relay switches 168 and 170 will therefore remain in their normal positions shown in FIGURE 5 rendering the wipers of potentiometers 102 and 104 active so that continued operation of motor 76 produces a slow dissolve action. When the wiper shaft 150 completes 180° rotation for the slow dissolve operation cam 122 reopens switch 130b to deenergize clutch 78 stopping rotation of the shaft. Switches 132 and 134 remain inactive during slow dissolve operation. When however the relay coil 166 is energized, the relay switches 168 and 170 are actuated to the other positions thereof so as to open both potentiometers and transfer control thereof to the ganged cam operated switches 134 whereby one of the potentiometers is shorted out depending upon which cycle the cam 126 is in while the other potentiometer is left at a position of maximum resistance. As hereinbefore noted, the cam 126 is contoured so as to displace the ganged switches 134 from one position to the other so that potential will be supplied in the proper direction for fast dissolve purposes during either 180° cycle. The relay coil 166 is therefore energized for fast dissolve purposes by a cue signal of a sufficiently long duration in excess of 20° rotation of the cam assembly resulting in the completion of the energizing circuit for the relay coil 166. Also, when the relay coil 166 is energized, the normally open holding switch 172 is closed so as to complete a parallel energizing circuit for the relay coil in order to maintain it energized after the cue signal switch 154 opens. At the end of the 180° cycle, the cam element 124 will of course open the switch 132 causing de-energization of the relay coil 166 in preparation for a new cycle. When the cam assembly has undergone 170° rotation, the cam contour of the cam element 128 will actuate one of the switches 136 and 137 so as to effect operation of one of the slide changers as aforementioned. Thus, the changeover cycle is of fixed duration, approximately three seconds. During this fixed cycle of operation, the system will either respond to a cue signal of long duration producing an instantaneous changeover between the projector lamps or respond to a cue signal of shorter duration in which case a slow dissolve action is effected of approximately two seconds producing the simultaneous dimming of one projector lamp and increase in the brilliance of the other projector lamp at rates so controlled as to eliminate reddening of the projection images as aforementioned.

Figure 10:
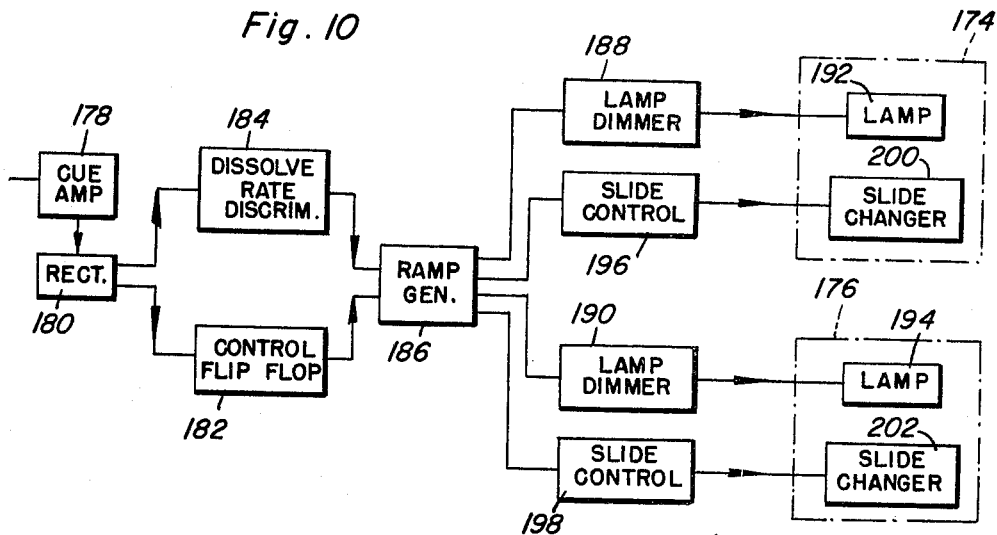
FIGURE 10 is a block diagram illustrating another form of control system made in accordance with the present invention.

Another form of control system achieving the same end result is diagrammed in FIGURE 10, this control system being associated with a tape recorder and two slide projectors 174 and 176. Just as in the case of the control system 10, a cue signal derived from the cue signal track of the tape recorder is received and amplified by the amplifier component 178 in the form of an A.C. signal which is fed to a rectifier 180 from which the rectified signal is dispatched to a bistable circuit or flip-flop 182 and a dissolve rate discriminator 184. The cue signal is thereby operative to change the state of the flip-flop by means of which the output level of a ramp generator 186 is changed between its two quiescent output levels. The duration of the cue signal on the other hand, is recognized by the dissolve rate discriminator 184 by means of which the rate of dissolve is programmed. The output of the dissolve rate discriminator 184 depends therefore on the duration of the cue signal and is operative on the ramp generator to control the rate at which it changes from one output level to the other. The output of the ramp generator is therefore applied to the lamp dimmer circuits 188 and 190 so as to control the simultaneous dimming of one lamp 192 and increase in the brilliance of the other lamp 194 associated with the projectors. The output of the ramp generator is also operative through the slide control circuits 196 and 198 to effect operation of the slide changers 200 and 202 at the end of the changeover cycles.

FIGURES 11 and 11a illustrate one exemplary solid state electronic circuit corresponding to the control system diagrammed in FIGURE 10. Referring initially to FIGURE 11, it will be observed that an A.C. cue signal burst may be applied to the primary 204 of the signal coupling transformer 206 so that a signal will be fed to a two-stage amplifier 208 including the transistors 210 and 212. The output of the amplifier is coupled by the capacitor 214 to a rectifier and filter circuit 216 so as to feed an amplified D.C. output pulse to the bistable, flip-flop circuit 220 and the dissolve rate discriminator 222 through the signal line 224. The cue signal applied through line 224 to the flip-flop circuit 220 will be operative to alternatively render the transistors 225 and 226 conductive in order to switch the flip-flop from one state to the other. Control of the dissolve rate discriminator is thereby exercised by development of a potential at the collector of the transistor 226 coupled by the resistor 227 to the transistor 229 of the discriminator 222 and by resistor 228 to the base of transistor 230 in the ramp generator circuit 232. The ramp generator produces an output at two different quiescent levels, the output being supplied by lines 234 and 235 to the lamp and slide changer controlling circuits. The rate at which the output level in line 234 is changed is controlled by the output of the dissolve rate discriminator appearing at the collector of the transistor 233. When transistor 229 is switched to the conductive state by the output of transistor 226 in one stable state of the flip-flop 220 the charging of capacitor 239 and the flow of bias current through rectifiers 231 to the base of transistor 233 will be regulated by the conductivity of transistor 235 coupled by resistor 237 to the signal line 224. The output potential developed at the collector of transistor 233 will therefore depend on the duration of the cue signal fed to line 224. The transistor 233 will therefore conduct current supplied either through diode 241 or 243 depending on the state to which transistor 229 has been switched. Transistor 238 is therefore rendered conductive by bias current supplied to its base through transistor 229 in order to regulate the rate of change in the output in line 234 of the ramp generator. Output line 234 is connected through diode 245 to the output collector of transistor 230 connected in series with transistor 247 to a 15-volt source, developing one of two quiescent output levels depending on the relative bias imposed on the bases of transistors 230 and 247. Output line 236 is controlled by transistor 240 the base of which is coupled to line 234 by an R-C network 249 to produce an output of corresponding magnitude in proper phase relation to the output developed in line 234. The output of the ramp generator is therefore supplied through line 236 for effecting operation of the slide changer mechanisms at the proper time while the output in the line 234 is supplied to the lamp control circuit.

With continued reference to FIGURE 11a, it will be observed that the lamp control circuit 242 includes the filaments for the projection lamps 192 and 194, these lamp filaments being respectively in series with silicon controlled rectifiers 244 and 246. The rectifiers are turned on during each operating cycle in order to conduct a minimum current sufficient to warm the lamp filaments without incandescence in order to prevent thermal shock. The voltage thereby developed across the lamp filaments will either increase or decrease so as to raise the lamp filament to full brilliance while dimming the other lamp filament at a non-linear rate regulated to eliminate reddening of the image during crossover. The silicon controlled rectifiers 244 and 246 are therefore switched on by the output from the unijunction transistors 248 and 250 respectively connected in a relaxation oscillator circuit having varying frequency outputs. The outputs of the oscillators are controlled by the output currents supplied thereto by the transistors 252 and 254 connected in a phase splitter circuit 256, the circuit also having adjusting potentiometers 258, 259 and 260 by means of which the circuit parameters may be regulated. The output from the ramp generator is therefore supplied to the base of transistor 252 by line 234 so as to produce two output currents from the collectors of the transistors 252 and 254 simultaneously changing in opposite directions. These output currents of the phase splitter circuit determine the intensity of the lamps beginning with a minimum output for the lamp being raised toward full brilliance while the other lamp filament is being dimmed. The output frequency of the oscillator transistors 248 and 250 will be proportional to the phase splitter output currents in order to achieve the aforementioned objective.

The lamp control circuit as well as all of the other components of the control system are supplied with power from a rectified power supply 262 which includes a full wave rectifier 264 connected to a pair of A.C. powerlines 266 and 268. The positive output of the rectifier is therefore connected to a high voltage line 270 and a low voltage line 272 through a filter circuit including the Zener diode 273 while a ground line 274 is connected to the lamp control circuit in order to establish a voltage across the lamp filaments regulated by the silicon controlled rectifiers 244 and 246. The rectifiers are therefore operative to control the filament voltage in a manner similar to that described in connection with the curves illustrated in FIGURE 9.

The output of the ramp generator is also applied through line 236 to the base of a level sensor transistor 276 and through the coupling resistor 278 to the base of transistor 280. The transistor 276 controls the output of the transistor 282 to thereby sense the higher of the quiescent output levels of the ramp generator by supply of a triggering signal to the unijunction transistor 284 coupled by the pulse differentiating network 286 to the output collector of the transistor 282. Similarly, the lower one of the quiescent output levels of the ramp generator will be sensed by the transistor 280 so as to control the output of transistor 288 amplified by transistor 289 to supply a pulse differentiated by network 290 to the unijunction transistor 292 for triggering thereof. The output of the unijunction transistors 284 and 292 are coupled by the transformers 294 and 296 to bridge circuits 304 and 306. The bridge circuits include silicon controlled rectifiers 298 and 300, each connected with respect to the bridge circuit so as to be supplied with rectified voltage from the power source. The control electrodes of the rectifier are connected in series with capacitors 310 to the secondaries of the transformers 294 and 296 which are also connected across load resistors 312 in order to supply pulses at the proper voltage level for firing the rectifier switches 298 and 300. It will therefore be appreciated, that the ramp generator output at its quiescent level will be sensed by either transistor 276 or transistor 280 producing an output pulse differentiated in either the network 286 or 290, these pulses being transformer coupled to the rectifiers 298 and 300 acting as trigger gates in order to render the bridge circuits 302 and 304 operative to supply alternating current to the slide advance motor 306 or 308 from the A.C. powerlines 266 and 268. Thus, the bridge circuits 302 and 304 are unique in that they furnish rectified current for operation of the silicon controlled rectifiers 298 and 300 while at the same time allowing flow of A.C. current to the load or motors. The slide advancing motors 306 and 308 are of course associated with the slide changer mechanisms 200 and 202 aforementioned. Accordingly, one or the other of the slide changer mechanisms are rendered operative when the ramp generator reaches one of its quiescent level outputs at the end of a working cycle in order to properly synchronize operation of the slide changer with the crossover between the projector lamps.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a pair of slide projectors each having a slide changing mechanism and a projection lamp for alternatively projecting images onto a common screen area, a programming device producing slide changeover pulses synchronized with audio output signals, pulse controlled means operatively connected to said slide changing mechanisms for operation thereof in response to said changeover pulses, means operatively connected to said projection lamps for simultaneously dimming one of the lamps and illuminating the other of the lamps during a changeover cycle of the pulse controlled means, dissolve control means responsive to the duration of said pulses for controlling the time interval during which said lamps are respectively dimmed toward extinction and illuminated toward maximum brilliance, current control means connected in series with each lamp and rendered conductive for unidirectionally limiting flow of current to a minimum value maintaining, the lamps heated without incandescence, and means connected to the current control means for rendering thereof conductive to vary the voltage across the lamps in opposite directions at non-linear rates of change preventing image reddening during said time interval.

2. In combination with a pair of slide projectors each having a slide changing mechanism and a projection lamp for alternatively projecting images onto a common screen area, a programming device producing slide changeover pulses, means operatively connected to said projection lamps for simultaneously dimming one of the lamps and illuminating the other of the lamps during changeover operation of fixed duration, dissolve control means responsive to the duration of said pulses for controlling the time interval during which said lamps are respectively dimmed toward extinction and illuminated toward maximum brilliance, current control means connected in series with each lamp and rendered conductive for unidirectionally limiting flow of current to a minimum value maintaining the lamps heated without incandescence, and means connected to the current control means for rendering thereof conductive to vary the voltage across the lamps in opposite directions at non-linear rates of change preventing image reddening during said time interval.

3. In a control system for regulating the interval and instantaneous rate of dimming of a lamp during changeover operation of a projector, a current control device connected in series with said lamp for limiting flow of current therethrough to a minimum value when rendered conductive, a dimmer circuit connected to said current control device for rendering thereof conductive at a varying frequency to change the voltage across the lamp at a non-linear rate, signal receiving means for producing a pulse, and switching control means responsive to said pulse for rendering the dimmer circuit operative during a predetermined interval corresponding to the duration of said pulse, said dimmer circuit including, a unijunction transistor having an output electrode connected to the current control device, an emitter and a bias electrode, voltage supply means connected to said bias electrode for supply of bias voltage thereto during said predetermined interval, and potentiometer means connected to the emitter and driven by the switching control means for varying the frequency with which said emitter is raised to a trigger potential producing an output from the output electrode.

4. The combination of claim 3 wherein said switching means comprises, a cam operated switch assembly operatively connected to the dimmer circuit for rendering the dimmer circuit operative during said predetermined interval, motor means rendered effective to drive the switch assembly and the potentiometer means of the dimmer circuit, relay means responsive to receipt of said pulse from the signal receiving means for rendering the motor means effective, and disabling means operatively connected to the potentiometer means for preventing operation thereof unless said pulse is of a predetermined duration.

5. In a control system for regulating the interval and instantaneous rate of dimming of a lamp during changeover operation of a projector, a current control device connected in series with said lamp for limiting flow of current therethrough to a minimum value when rendered conductive, a dimmer circuit connected to said current control device for rendering thereof conductive at a varying frequency to change the voltage across the lamp at a non-linear rate, signal receiving means for producing a pulse, and switching control means responsive to said pulse for rendering the dimmer circuit operative during a predetermined interval corresponding to the duration of said pulse, said dimmer circuit including a unijunction transistor having an output electrode connected to the current control device, an emitter and a bias electrode, an oscillator circuit connected to said emitter and bias electrode for producing an output from said output electrode varying in frequency, and phase splitting means connected to the oscillator for controlling said variation in frequency in accordance with the output thereof.

6. The combination of claim 5 wherein said switching control means comprises, a ramp generator connected to the phase splitting means of the dimmer circuit, said ramp generator having two quiescent output levels, flip-flop means connected to said ramp generator for changing the output level thereof when switched between two stable states thereof, means connecting said signal receiving means to the flip-flop means for switching thereof upon receipt of said pulse, and rate discriminator means connecting said signal receiving means to the ramp generator for varying the rate of change between the output levels in accordance with the duration of the pulse.

7. In combination with a pair of slide projectors each having a slide changing mechanism and a projection lamp for alternatively projecting images onto a common screen area, a programming device producing slide changeover pulses synchronized with audio output signals, pulse controlled means operatively connected to said slide changing mechanisms for operation thereof in response to said changeover pulses, means operatively connected to said projection lamps for simultaneously dimming one of the lamps and illuminating the other of the lamps during a changeover cycle of the pulse controlled means, dissolve control means responsive to the duration of said pulses for controlling the time interval during which said lamps are respectively dimmed toward extinction and illuminated toward maximum brilliance, and phase control means operatively connected to the pulse controlled means for effecting operation of the slide changing mechanism at the end of the changeover cycle, said phase control means including a source of alternating current, a bridge circuit operatively connected between said source and the slide changing mechanism, and gate means operatively connected between the pulse controlled means and the bridge circuit for allowing passage of alternating current through the bridge circuit to the slide changing mechanism in response to trigger pulses from the pulse controlled means.

References Cited by the Examiner
UNITED STATES PATENTS

| | | | |
|---|---|---|---|
| 2,607,266 | 8/1952 | Rabinowitz | 88—24 |
| 3,029,316 | 4/1962 | Pine | 179—100.2 |
| 3,047,675 | 7/1962 | Berryhill | 179—100.2 |
| 3,093,030 | 6/1963 | Carillo | 88—28 |
| 3,110,216 | 11/1963 | Chalfin | 88—28 |
| 3,177,767 | 5/1965 | Templeman | 179—100.2 |

NORTON ANSHER, *Primary Examiner.*

V. A. SMITH, *Assistant Examiner.*